April 14, 1953   R. D. ARBOGAST   2,635,128
DRY CELL
Filed May 25, 1949
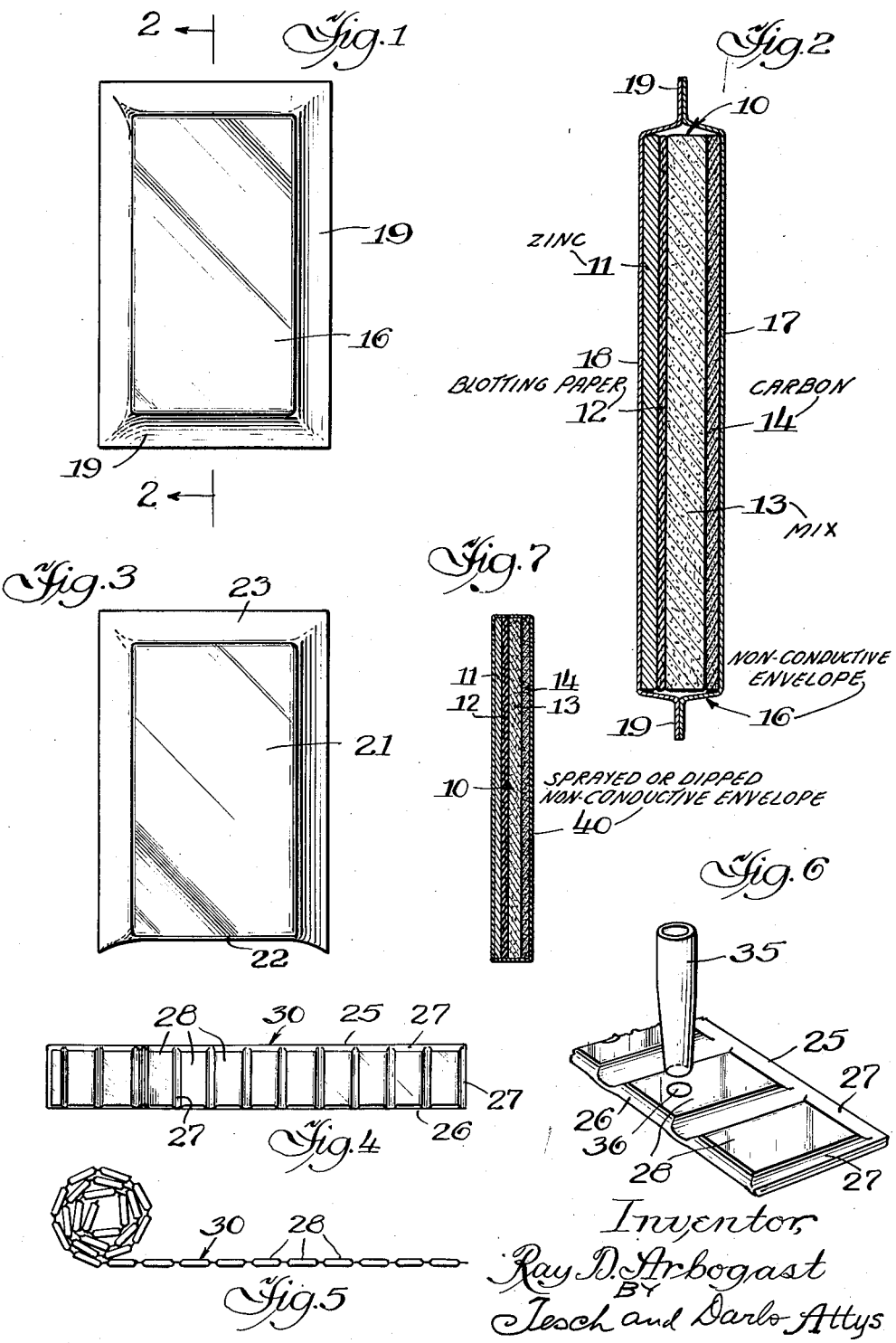
Inventor,
Ray D. Arbogast
BY
Tesch and Darbo Attys Patented Apr. 14, 1953

2,635,128

UNITED STATES PATENT OFFICE 2,635,128

DRY CELL

Ray D. Arbogast, Freeport, Ill., assignor, by mesne assignments, to Burgess Battery Company, Freeport, Ill., a corporation of Delaware Application May 25, 1949, Serial No. 95,300

5 Claims. (Cl. 136—132)

This invention relates to the manfacture of dry batteries and particularly to the provision of improved dry cells adapted for assembly into a multi-cell battery. More specifically, it relates to a dry cell, especially of the flat or plate type, which is completely enclosed in an envelope of non-conductive, liquid-impervious material.

In making multi-cell batteries, it is a practical convenience and advantage to be able to manufacture the cells in one operation and assemble them into the batteries in another operation. With the ordinary cylindrical cell, this is commonly done because the individual cells are completed and sealed with a fusible sealing compound before they are assembled into a battery. With the flat type of cell, this has not been the practice. The flat cell is made up of elements which are of thin, flat shape and the finished cell is in the form of a flat wafer having a thickness considerably less than its length or width. These wafers are then arranged one against another in stacked relationship and electrically connected together to form the multi-cell battery. The assembly is enclosed by various means upon several of its sides, but there is usually at least one side which is left unenclosed and this is sealed by a fusible sealing element which forms the common seal for all of the cells and the battery. In another type of battery, the marginal portions and edges only of each wafer-shaped cell are enclosed by a thin liquid-impervious integument and the remainder of the surfaces of the cell are exposed. In this construction also, the cells are not sealed until they are assembled into a battery.

In the prior flat cell structures, therefore, the advantage of being able to form the individually complete and sealed cells is lost. One of the advantages is that the cells may be stored for any desired length of time. It is advantageous to age cells before they are assembled into batteries, rather than to use freshly made cells. Defects in the cells usually develop within several days to a few weeks to the point where they will show up by causing the cell to exhibit a sub-standard voltage under test. By giving the cells this preliminary aging and then testing them individually for voltage, the necessity of discarding an entire battery because of the presence of one defective cell is avoided. This frequently occurs when freshly made cells are assembled into batteries.

Another advantage is that the enclosed cells may be stored for a long period of time. The cells are sealed from the atmosphere and are preserved without losing moisture or otherwise deteriorating, whereby they are kept in satisfactory condition for use for a long time.

Another advantage consists in a flexibility of operation and an economy in manufacture. One set of workers or one department can be concentrated on the operation of cell construction and another set of workers or department can be concentrated on the operation of battery assembly. In fact, the cells can be manufactured in one plant and shipped to another plant or several other plants where only the assembly operation takes place. The plant requirements in such circumstances are more simple and economical and the workers' skills are more highly developed in their specialized operations, all of which results in greater efficiency and economy. This has been demonstrated to be true in practice.

In accordance with the present invention, the advantages described are obtained with flat cells by the provision of an improved cell unit which is completely enclosed in a primary sealing envelope of non-conductive, liquid-impervious material. As used herein, the term "primary envelope" means an envelope which directly and immediately encloses the active elements of a dry cell, including the electrolyte and moist depolarizing composition. This primary envelope serves as the immediate and first barrier to the escape of moisture from the cell elements. The envelope may be formed from a sheet or sheets large enough to enclose only a single cell or it may be a continuous wrapper having the material thereof arranged and sealed together so as to form a plurality of envelopes or pockets each completely enclosing a cell.

Accordingly, it is the principal object of the invention to provide a dry cell of the flat type which is completely enclosed in a primary envelope of non-conductive, liquid-impervious material. It is also an object to provide a plurality of spaced apart cells of the flat type covered by a wrapper of sheet material, which wrapper is so arranged and sealed together at such locations as to form a plurality of pockets each completely enclosing one of the cells.

In the accompanying drawing,

Fig. 1 is a plan view of a single cell with its enclosure, constructed in accordance with the present invention;

Fig. 2 is a sectional view taken along line 2—2 of Fig. 1;

Fig. 3 is a plan view of a single cell with its enclosure constructed in accordance with a different embodiment of the invention;

Fig. 4 is a plan view of a partially rolled up continuous string of pockets of the envelope material, each pocket completely enclosing a cell;

Fig. 5 is a side view of the partially rolled up string of pockets of Fig. 4;

Fig. 6 is a perspective view illustrating the manner in which openings may be formed in the cell pockets prior to connecting the cells together into a battery, and Fig. 7 is a sectional view similar to Fig. 2, of a different embodiment of the invention.

Referring first to Fig. 2, the dry cell is indicated generally by the numeral 10. It consists of thin, flat sheet or plate-form elements which are arranged in stacked relationship. Starting at one side, the first element is the negative electrode 11, which may be a plate of zinc or other suitable metal. The next element is a sheet 12 of bibulous separating material, such as blotting paper, moistened with a suitable electrolyte such as an aqueous solution of ammonium chloride and zinc chloride. The next element is the flat mix slab 13 which may be composed of the usual depolarizing composition, such as manganese dioxide and carbon and is also moistened with the electrolyte. The last element is the positive electrode 14 of a suitable material, such as carbon.

The elements are stacked together in pressure contact with one another to form the flat, wafer-shaped dry cell 10. The cell 10 has positive and negative electrodes 14 and 11 located at its opposite outer broad surfaces respectively. The said electrodes do not have terminal conductors connected to them, but are adapted to be connected to such conductors or to the terminals of other similar cells to make a multiple cell battery. The flat cell elements are indicated in Fig. 1 as being of rectangular shape but they may be of any desired shape. In accordance with the present invention, the cell is completely enclosed and primarily sealed from the atmosphere by a liquid-impervious, electrolyte-resistant, non-conductive envelope which may be in any suitable form. In the preferred forms it is fashioned from a flexible sheet which may be composed of the rubber-hydrochloride composition sold under the trade mark "Pliofilm," rubber, polymerized vinyl chloride, the copolymer of vinyl chloride and vinyl acetate, or the like.

In the form shown in Fig. 1, this primary sealing envelope is indicated generally by the numeral 16. In making the envelope 16, the dry cell 10 is arranged between two sheets 17 and 18 of the envelope material, which sheets are of a shape and size such that each covers a broad surface of the flat cell and the margins thereof project beyond the edges of the cell. The said marginal portions of the two sheets are then pressed together and caused to adhere to each other to form a liquid-tight joint 19. All of the materials mentioned, except rubber, are thermoplastic and such materials may be heat-sealed at the joints by suitably heating and pressing the sheets together, when the material of the two sheets softens and adheres. The joint may also be made by means of a suitable adhesive, an example of which is one composed of polystyrene in a suitable solvent such as toluene. Other adhesives may be used such as a liquid resistant glue, rubber cement, or the like. The joint 19 projects outwardly from the edges of the dry cell 10, the projecting margin extending around the periphery of the cell as indicated in Fig. 1.

In the embodiment illustrated in Fig. 3, the primary envelope 21 is formed of one sheet of material instead of two sheets, and the sheet is folded at a median portion 22 thereof and arranged so that the fold covers one edge of a dry cell 10 such as is illustrated in Fig. 2 and the sections on opposite sides of the fold cover the broad surfaces of the cell respectively with the margins of the sections projecting beyond the remaining edges of the cell. The projecting margins are then caused to adhere together to form a liquid-tight joint 23 in the manner described heretofore, said joint extending around three edges of the cell as shown in Fig. 3.

A plurality of cells may be provided with individual envelopes in a continuous process employing an elongated strip or ribbon of the sheet material to form a continuous wrapper as is illustrated in Fig. 4. The ribbon 25 is folded at 26 in the form of a trough and the cells 10 are arranged in the trough in edge-to-edge spaced-apart relationship. The ribbon is of such dimensions that the sections on opposite sides of the folds cover the broad surfaces of the cells respectively and the margins extend beyond the edges of the cells other than the edges disposed at the fold 26. The said margins and the sheet material between the cells is then pinched or pressed together and caused to adhere to form liquid-tight joints 27. The fold 26 and joints 27 cooperate to form envelopes or pockets 28 each of which completely encloses one of the cells. The result is an elongated flexible string or ribbon of dry cells each completely enclosed in a separate pocket, the string being indicated generally by the numeral 30. As an alternative, the wrapper may be formed of two superimposed ribbons instead of one folded ribbon. In such case, the fold 26 is replaced by a sealed joint in the same manner as the joint 19 in the envelope 16 of Fig. 1 occurs in place of the fold 22 in the envelope 21 of Fig. 3.

For storage purposes, the string 30 of enclosed cells may be wound into a roll, as illustrated in Figs. 4 and 5. The completely enclosed cells may then be stored for any desired length of time before they are fabricated into multiple cell batteries. When it is desired to assemble the cells into a battery, an opening is provided in the envelope on both of the broad sides of each cell to expose portions of both of the electrodes 10 and 14. A suitable method and means for providing the openings is illustrated in Fig. 6. The continuous wrapper 25 enclosing a number of cells is shown, but the method may be applied as well to the separate envelopes 16 and 21 shown in Figs. 1, 2 and 3. A tubular instrument 35 is pressed against the surface of the wrapper. With the thermoplastic materials mentioned heretofore, the end of the instrument need not have a sharp edge, but may be heated to a temperature sufficiently high to fuse the sheet material upon contact. Suction is applied to the interior of the instrument 35, and upon bringing the end of the instrument into contact with the sheet material a circular section thereof is severed from the body of the sheet by fusion and is drawn away by the suction to form the opening 36 in the envelope which exposes an electrode of the contained cell. Instead of employing a heated instrument 35, the opening may be made by employing a similar instrument which is unheated but has a sharp edge. The opening is formed by pressing the instrument 35 against the sheet and cutting the latter. Otherwise, the process is similar to that described heretofore.

Openings are formed in the manner described on both sides of each of the cells which it is desired to assemble into batteries. In the case of the continuous wrapper 25, the latter may then be folded accordion-wise in such manner that the cells are arranged in stacked relation. In such case the order of the cell elements should be reversed in each successive cell. As an alternative, the joints 27 may be made relatively wide and may be severed along a median line to provide separate individually wrapped cells. The openings 36 are so located that those in contiguous envelope walls are in register with each other when the cells are arranged in stacked relation. A suitable conductive material, such as a conductive cement may be applied to the electrodes at the openings, such cement serving to interconnect the cells and connect some of the cells to suitable battery terminals and, if desired, to seal the openings 36. Such cement may be composed of finely divided particles of a conductive substance such as carbon, silver or the like suspended in a suitable vehicle such as polystyrene softened by or dissolved in benzene. If cells having the separate envelopes 16 or 21 are used, the openings may be provided and the cells stacked in pressure contact with one another and interconnected in the same manner as described heretofore to form a multiple cell battery. The stacking and connecting of the cells into a battery are not a part of the present invention.

The embodiments which have been described heretofore are the preferred forms of the invention, and the latter is not limited thereto but contemplates broadly the provision of a thin, liquid-impervious, non-conductive primary sealing envelope for the flat, wafer form of cell. For example, the embodiment shown in Fig. 7 may be formed by dipping the cell 10 in or spraying it with a solution of the polymerized vinyl chloride or the copolymer of vinyl chloride and vinyl acetate mentioned heretofore in a suitable solvent such as acetone and evaporating the solvent. Such process forms the continuous layer or film 40 of the liquid-impervious non-conductive coating material completely enveloping the cell 10. As another example, the elongated wrapper 25 shown in Fig. 4 may be made sufficiently wide to accommodate a number of spaced-apart rows of cells, and elongated joints similar to joint 27 may be formed extending in cross-wise lines between the cells to form an individual pocket for each cell. Other modifications will occur to those skilled in the art and the invention is limited only in accordance with the scope of the appended claims.

What is claimed is:

1. As a new article, an assembly of superposed thin wafer-shaped dry cell elements including a positive electrode and a negative electrode at the opposite broad surfaces respectively of said assembly and moist mix cake and bibulous separator elements sandwiched between said electrodes and exposed at an edge of said assembly, and an imperforate primary envelope of flexible, non-conductive sheet material completely enclosing said assembly of elements and sealing the same from the atmosphere, said envelope providing a moisture-proof closure for said assembly of cell elements to minimize change from the original condition thereof pending use.

2. The article as claimed in claim 1 in which the envelope is composed of flexible, thermoplastic sheet material.

3. As a new article, an assembly of superposed thin wafer-shaped dry cell elements including a positive electrode and a negative electrode at the opposite broad surfaces respectively of said assembly and moist mix cake and bibulous separator elements sandwiched between said electrodes and exposed at an edge of said assembly, and an imperforate primary envelope composed of flexible, non-conductive sheet material having two portions covering respectively the opposite broad surfaces of said assembly and having marginal portions extending beyond edges of said assembly, said marginal portions being in mutually adherent relation to form an envelope completely enclosing said assembly and sealing the same from the atmosphere, said envelope providing a moisture-proof closure for said assembly of cell elements to minimize change from the original condition thereof pending use.

4. As a new article, a plurality of spaced-apart assemblies of dry cell elements, each said assembly including a positive electrode and a negative electrode at the opposite broad surfaces respectively of said assembly and moist mix cake and bibulous separator elements sandwiched between said electrodes and exposed at an edge of said assembly, and a continuous wrapper of flexible, non-conductive sheet material adhering to itself at such locations as to form a plurality of imperforate pockets each completely enclosing one of said assemblies of cell elements and sealing the same from the atmosphere, said pockets providing moisture-proof closures for said assemblies of cell elements to minimize change from the original condition thereof pending use.

5. As a new article, a plurality of spaced-apart assemblies of dry cell elements, each said assembly including a positive electrode and a negative electrode at the opposite broad surfaces respectively of said assembly and moist mix cake and bibulous separator elements sandwiched between said electrodes and exposed at an edge of said assembly, said cell assemblies being spaced apart in edge-to-edge relationship, an imperforate primary envelope of thin, non-conductive sheet material completely enclosing each of said assemblies and sealing the same from the atmosphere, whereby to maintain said assemblies in substantially their original condition pending use, and flexible means joining together the adjacent edges of the adjacent envelopes to form a continuous string of sealed cell assemblies.

RAY D. ARBOGAST.

References Cited in the file of this patent

UNITED STATES PATENTS

| Number | Name | Date |
|---|---|---|
| 1,509,650 | Heise | Sept. 23, 1924 |
| 1,549,851 | Benner | Aug. 18, 1925 |
| 1,793,710 | Milmoe | Feb. 24, 1931 |
| 2,302,846 | Farmer et al. | Nov. 24, 1942 |
| 2,307,764 | Deibel et al. | Jan. 12, 1943 |
| 2,355,197 | Anthony et al. | Aug. 8, 1944 |
| 2,519,527 | Wilkinson | Aug. 22, 1950 |

FOREIGN PATENTS

| Number | Country | Date |
|---|---|---|
| 206,704 | Great Britain | Nov. 15, 1923 |
| 47,313 | Holland | Nov. 16, 1939 |
| 556,907 | Great Britain | Oct. 27, 1943 |

OTHER REFERENCES

"Modern Packaging," May 1944, page 60,